(12) United States Patent
Balaka

(10) Patent No.: US 12,561,293 B2
(45) Date of Patent: Feb. 24, 2026

(54) DYNAMIC DATABASE CONFIGURATION BASED ON APPLICATION PERFORMANCE METRICS

(71) Applicant: Salesforce, Inc., San Francisco, CA (US)

(72) Inventor: Jyothi Balaka, San Ramon, CA (US)

(73) Assignee: Salesforce, Inc., San Francisco, CA (US)

( * ) Notice: Subject to any disclaimer, the term of this patent is extended or adjusted under 35 U.S.C. 154(b) by 3 days.

(21) Appl. No.: 18/394,725

(22) Filed: Dec. 22, 2023

(65) Prior Publication Data

US 2025/0209047 A1    Jun. 26, 2025

(51) Int. Cl.
| | |
|---|---|
| *G06F 16/20* | (2019.01) |
| *G06F 11/34* | (2006.01) |
| *G06F 16/21* | (2019.01) |
| *G06F 16/22* | (2019.01) |
| *G06F 16/2453* | (2019.01) |

(52) U.S. Cl.
CPC ........ *G06F 16/213* (2019.01); *G06F 11/3409* (2013.01); *G06F 16/2272* (2019.01); *G06F 16/2453* (2019.01)

(58) Field of Classification Search
CPC ............................ G06F 16/213; G06F 16/2272
See application file for complete search history.

(56) References Cited

U.S. PATENT DOCUMENTS

| | | | | |
|---|---|---|---|---|
| 10,402,419 | B1 * | 9/2019 | Rubinstein ........ | G06F 16/24575 |
| 11,755,394 | B2 | 9/2023 | Balaka | |
| 11,775,519 | B2 | 10/2023 | Balaka | |
| 11,928,088 | B1 * | 3/2024 | Zhou ...................... | G06F 16/213 |
| 2014/0095484 | A1 * | 4/2014 | Kursar ................... | G06F 16/248 |
| | | | | 707/722 |
| 2020/0293503 | A1 * | 9/2020 | P ............................... | G06N 5/04 |

(Continued)

OTHER PUBLICATIONS

Zhang et al., Towards Dynamic and Safe Configuration Tuning for Cloud Databases. Jun. 11, 2022 [retrieved Nov. 27, 2024]. In Proceedings of the 2022 International Conference on Management of Data (SIGMOD '22), pp. 631-645. Retrieved from the Internet: https://doi.org/10.1145/3514221.3526176 (Year: 2022).*

*Primary Examiner* — Kristopher Andersen

(74) *Attorney, Agent, or Firm* — Polygon IP, LLP

(57)    ABSTRACT

One or more observed database metric values characterizing observed database performance information about a database system implemented in a computing services environment may be determined. One or more observed application metric values characterizing observed performance information about a network-accessible application implemented on an application server in the computing services environment may be determined. The application server may store information in the database system generated while providing computing services via the computing services environment. An updated database system configuration setting for the database system may be determined by applying a machine learning prediction model to a dataset including the one or more observed database metric values and the one or more observed application metric values. An instruction to update the database system may be transmitted based on the updated database system configuration setting.

20 Claims, 9 Drawing Sheets

(56)　　　　　　　References Cited

U.S. PATENT DOCUMENTS

| | | |
|---|---|---|
| 2021/0240558 A1 | 8/2021 | Balaka |
| 2022/0327126 A1 | 10/2022 | Balaka |
| 2024/0202190 A1* | 6/2024 | Muenkel ............. G06F 16/2433 |

* cited by examiner

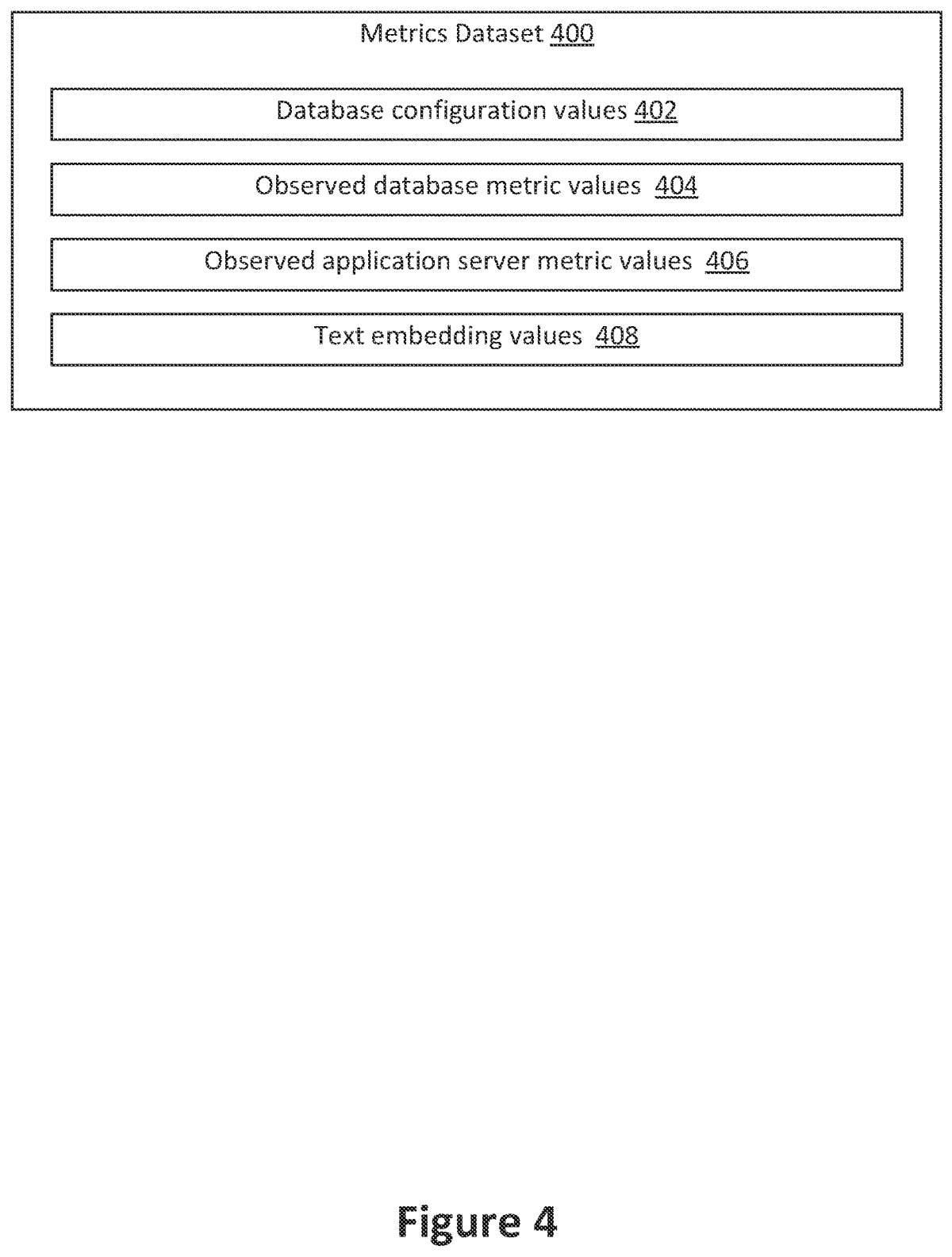

Metrics Dataset <u>400</u>

Database configuration values <u>402</u>

Observed database metric values <u>404</u>

Observed application server metric values <u>406</u>

Text embedding values <u>408</u>

Figure 4

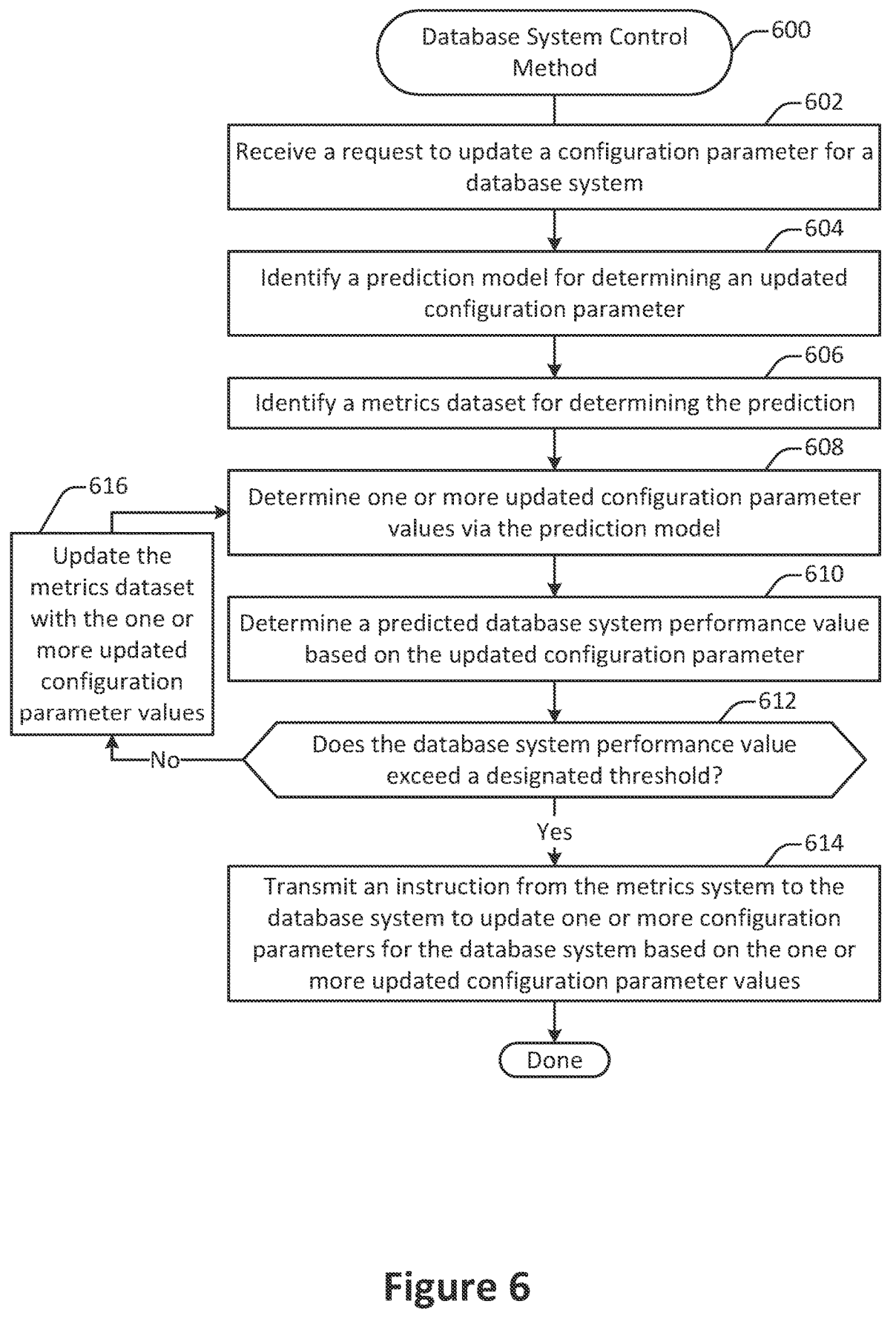

Database System Control Method ⟋—600

Receive a request to update a configuration parameter for a database system ⟋—602

Identify a prediction model for determining an updated configuration parameter ⟋—604

Identify a metrics dataset for determining the prediction ⟋—606

Determine one or more updated configuration parameter values via the prediction model ⟋—608

⟋—616
Update the metrics dataset with the one or more updated configuration parameter values Determine a predicted database system performance value based on the updated configuration parameter ⟋—610

Does the database system performance value exceed a designated threshold? ⟋—612

—No—

Yes

Transmit an instruction from the metrics system to the database system to update one or more configuration parameters for the database system based on the one or more updated configuration parameter values ⟋—614

Done

Figure 6

DYNAMIC DATABASE CONFIGURATION BASED ON APPLICATION PERFORMANCE METRICS

FIELD OF TECHNOLOGY

This patent application relates generally to database systems, and more specifically to dynamic configuration of database systems.

BACKGROUND

Cloud computing services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Web applications implemented in cloud computing environment rely on databases for storage of data. Database management relies on performance optimization techniques for both applications and databases. Such techniques typically rely on historical statistics and query execution plans. Despite the presence of such techniques, in many situations databases suffer from problems such as over-provisioning, under-provisioning, inefficient query execution plans, and other issues. Accordingly, improved techniques for database management are desired.

BRIEF DESCRIPTION OF THE DRAWINGS

The included drawings are for illustrative purposes and serve only to provide examples of possible structures and operations for the disclosed inventive systems, apparatus, methods, and computer program products for database system optimization. These drawings in no way limit any changes in form and detail that may be made by one skilled in the art without departing from the spirit and scope of the disclosed implementations.

FIG. 4 illustrates a metrics dataset, configured in accordance with one or more embodiments.

FIG. 6 illustrates a method of controlling a database system, performed in accordance with one or more embodiments.

DETAILED DESCRIPTION

Figure 1:
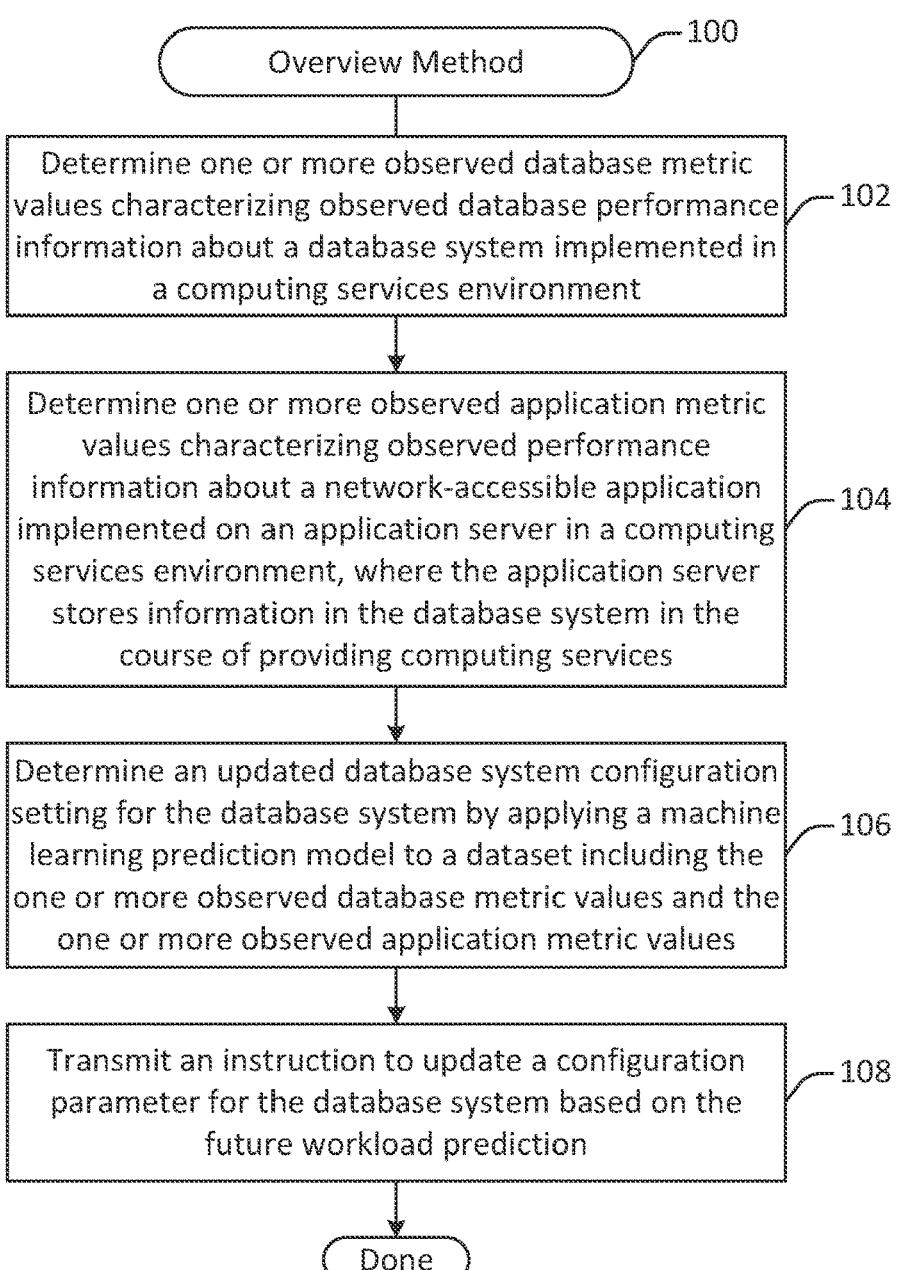
FIG. 1 illustrates an overview method performed in accordance with one or more embodiments.

According to various embodiments, techniques and mechanisms described herein provide for an adaptive database system that operates at a granular level based on an integrated dataset that blends application-level metrics and data with database performance data to provide improved database performance optimization strategies. Adaptive optimization strategies may be dynamically analyzed, correlated, and applied based on the integrated dataset. In this way, the database system may be aligned with the real-time demands and intricacies of the associated application or applications, resulting in improved responsiveness and efficiency in a data-driven ecosystem.

In some embodiments, database configurations settings may be adjusted at least in part based on metric values determined by observing one or more applications and the database system itself. For example, agents embedded within application frameworks may collect various types of application-level metrics such as user interactions, transaction frequencies, resource consumption patterns, and/or other such metrics. As another example, database performance data such as query execution times, transaction throughput, resource utilization, and/or other such metrics may be monitored.

According to various embodiments, collected metrics may be parsed to identify patterns and correlations between application activities and database operations. For instance, the system may identify specific queries that are triggered by particular user interactions or application events.

In some implementations, parsed data may be streamed to a central repository. Such streaming may be conducted in real-time or near real-time. Once received at the central repository, the data may be analyzed to identify patterns, anomalies, and/or trends. For instance, the system may recognize when a surge in user interactions leads to specific database queries which in turn cause performance bottlenecks. In this way, the system may be updated with the latest application and database system performance insights.

In some embodiments, potential issues in a database system may be predicted using a machine learning prediction model based on correlated data patterns. Such issues may be identified in real-time or near real-time, allowing the system to proactively optimize the database's performance based on incoming application-level data.

According to various embodiments, the database metric predictions may allow for making dynamic decisions on optimization strategies. For instance, the system may adjust one or more database indexes, query execution plans, and/or resource allocations based on current application demands, detected performance issues, and/or predicted future performance.

In some implementations, the system may continually update operations over time. For instance, as configuration changes are applied, the system may monitor their impact. In this way, the system may learn from the interventions and improve the interventions over time. This iterative learning process allows the system to become increasingly adept at predicting and mitigating performance issues specific to the application's behavior.

Conventional database optimization techniques rely on database metrics alone to adjust database configuration. In contrast, techniques and mechanisms described herein provide for dynamically integrating application-level metrics and data with database metrics and/or text-based information. In some embodiments, application metrics such as request patterns, data usage trends, and user engagement levels may be intelligently correlated with database performance data, such as query response times, resource utilization, and index efficiency. The resulting insights facilitate a more comprehensive understanding of how application behavior directly impacts database operations.

Conventional database optimization techniques fail to adapt to rapid changes in database usage. In contrast, techniques and mechanisms described herein provide for the dynamic adjustment of query execution plans, resource allocation, and indexing strategies based on real-time or near real-time application insights. In some embodiments, databases can respond more effectively to changing workloads and optimize resource utilization. Thus, techniques and mechanisms described herein not only improve application response times but also enhances overall system efficiency for database systems and computing services environments.

Conventional techniques for database system operation provide for only a superficial examination of the database's health in many performance-impacting situations, leading the root causes unclear. For example, the root cause of a database system performance issue may lie in the application server accessing the database system rather than in the database system itself, but such a root cause would not be discovered by a conventional analysis. In contrast, techniques and mechanisms described herein provide for the generation of a comprehensive view of the database system's health from the vantage point of the application itself. In some embodiments, the true state of the database system's health may be revealed, offering insights unavailable in conventional approaches.

In some embodiments, techniques and mechanisms described herein provide for improved efficiency of the computing system itself. The dynamic adjustment of database system configuration parameters such as query execution plans and resource provisioning based on the incorporation of database system metrics with application server metrics, a database system may be able to operate more efficiently, with fewer resources, with lower response time, and/or with fewer performance issues in comparison to conventional techniques.

FIG. 1 illustrates an overview method 100 performed in accordance with one or more embodiments. The method 100 may be performed at a computing services environment such as the computing services environment 200 shown in FIG. 2.

One or more observed database metric values characterizing information about a database system implemented in a computing services environment are determined at 102. In some embodiments, an observed database metric value may be any suitable measurement providing an indication of actual database system performance, usage, status, or operating condition. For example, the observed database metric value may be a number of database requests received, a number of active database connections, a number of database CPU cycles used, a volume of data transmitted, a number of database rows accessed, or any other metric value. Such metrics may be defined over a period of time (e.g., one minute, one second, five minutes, etc.). Additional details regarding the determination of observed database metric values are discussed with respect to the computing services environment 200 shown in FIG. 2.

One or more observed application metric values characterizing observed performance information about a network-accessible application implemented on an application server in the computing services environment are determined at 104. The application server may store information in the database system in the course of providing computing services to entities via the internet. In some embodiments, an observed application metric values may be any suitable measurement providing an indication of web application or application server performance, usage, status, or operating condition. For example, the observed application metric value may be a number of application requests received, a number of active sessions, a number of CPU cycles used, a volume of data processed or transmitted, or any other metric value. Such metrics may be defined over a period of time (e.g., one minute, one second, five minutes, etc.). Additional details regarding the determination of observed application metric values are discussed with respect to the method 300 shown in FIG. 3.

An updated database system configuration setting for the database system is determined at 106 by applying a machine learning prediction model to a dataset including the one or more observed database metric values and the one or more observed application metric values. An instruction to update a configuration parameter for the database system based on the updated database system configuration setting is transmitted at 108. According to various embodiments, any of a variety of configuration settings may be updated. For example, additional computing resources may be provisioned. As another example, the amount of provisioned computing resources may be decreased. Additional details regarding the determination of an updated database system configuration setting are discussed with respect to the method 500 shown in FIG. 5.

Figure 2:
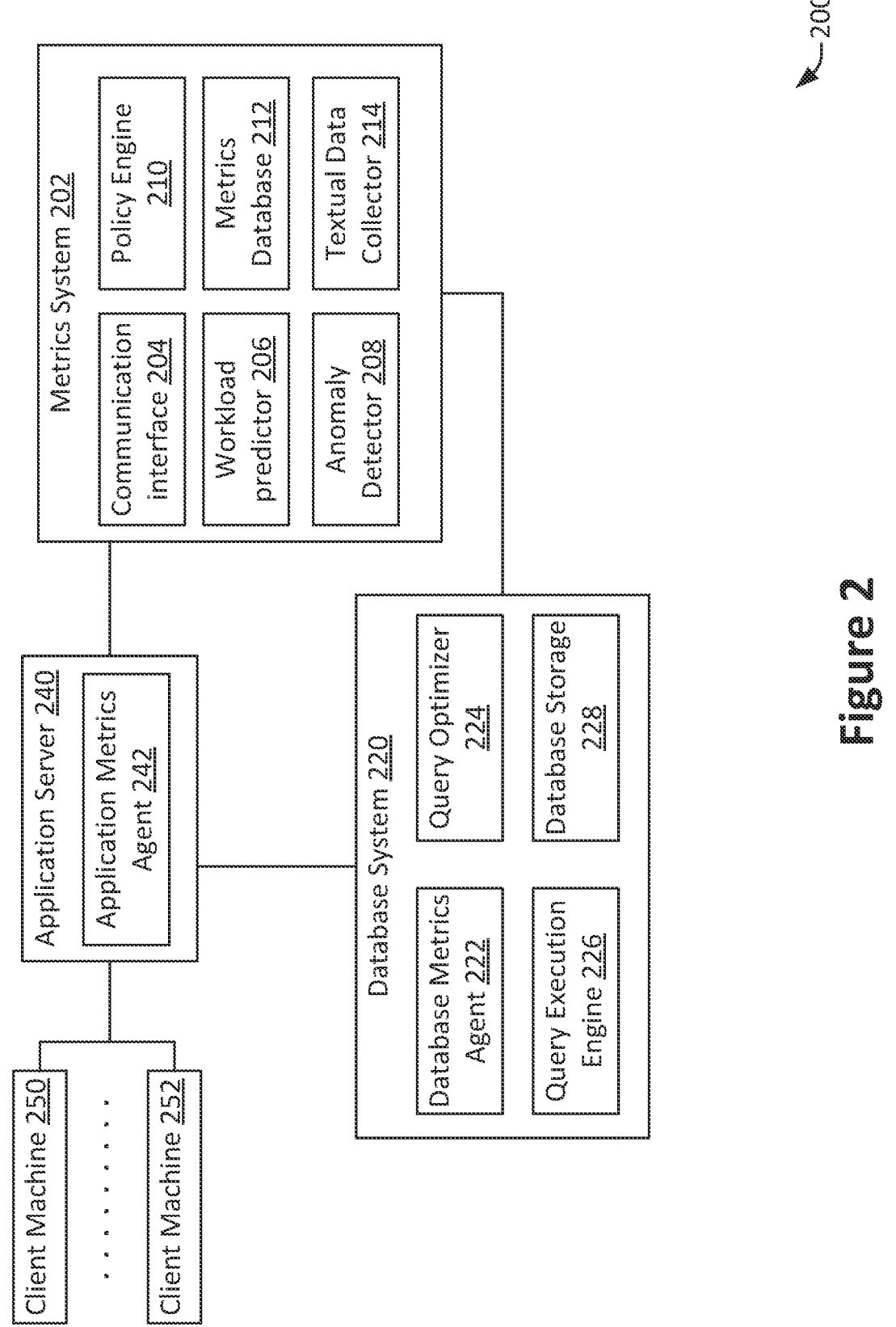
FIG. 2 illustrates a computing services environment, configured in accordance with one or more embodiments.

FIG. 2 illustrates a computing services environment 200, configured in accordance with one or more embodiments. The computing services environment 200 may be used to implement one or more procedures discussed herein. The computing services environment 200 includes a metrics system 202 in communication with a database system 220 and an application server 240, which in turn is in communication with client machines 250 through 252. The metrics system 202 includes a communication interface 204, a workload predictor 206, an anomaly detector 208, a policy engine 210, a metrics database 212, and a textual data collector 214. The database system 220 includes a database metrics agent 222, a query optimizer 224, a query execution engine 226, and database storage 228. The application server 240 includes an application metrics agent 242.

According to various embodiments, the application server 240 is configured to provide one or more of a variety of on-demand computing services to the client machines 250 through 252 via the internet. For instance, the application server 240 may provide services such as customer relations management, data storage, sales and/or service management, and the like.

In some embodiments, the application metrics agent 242 is configured to collect information about an application provided by the application server 240. For instance, the applications metric agent 242 may be implemented as a library of code embedded into a web application framework for providing a web application. The applications metric agent 242 may collect information about the functioning of the web application, such as information about the number and type of requests received from the client machines, the number and type of requests sent to the database system 220, an amount of data processed by the web application, and/or any other information. The particular information to collect via the application metrics agent 242 may be determined by, for instance, a developer who embeds the application metrics agent 242 in the web application framework.

In some implementations, the information collected by the application metrics agent 242 may be parsed and sent to the metrics system 202. Information received by the metrics system 202 may be stored in the metrics database 212 and/or processed in various ways, discussed in more detail below.

In particular embodiments, an application server may have more than one application metrics agent installed. For instance, an application server may be configured to provide more than one web application, and different web applications may each include a respective application metrics agent.

According to various embodiments, the database system 220 stores information used by the application server 240 to provide the web application or applications. For example, the database system 220 may store information associated with an entity accessing the web application. As another example, the database system may store information generated and/or retrieved in the course of providing a web application. Information may be stored in the database storage 228.

In some implementations, access to the information stored in the database storage 228 may be provided by the query execution engine 226, which may execute query requests from the application server 240 to store data to the database storage 228 and retrieve data from the database storage 228. Such query requests may be processed by the query optimizer 224, which may generate an efficient query execution plan for execution by the query execution engine.

In some embodiments, information about the operation of the database system 220 may be collected by the database metrics agent. The collected database metrics may include information characterizing database request traffic flow, database connections, database resource utilization, and the like. The collected database metrics may be sent to the metrics system 202.

The metrics system 202 is configured to receive metrics data from the application metrics agent 242 and the database metrics agent 222 via the communication interface 204. Such information may be stored in the metrics database 212. The stored information may be used to predict future database system and/or application server workloads via the workload predictor 206, detect anomalous conditions via the anomaly detector 208, and/or determine updated database system policies via the policy engine 212.

According to various embodiments, procedures such as workload prediction, anomaly detection, and/or policy determination may be guided by the textual data collector 214. The collected text data may include information received from a system administrator, information gleaned from user interactions with the application server 240, or information from external sources such as social media.

Figure 3:
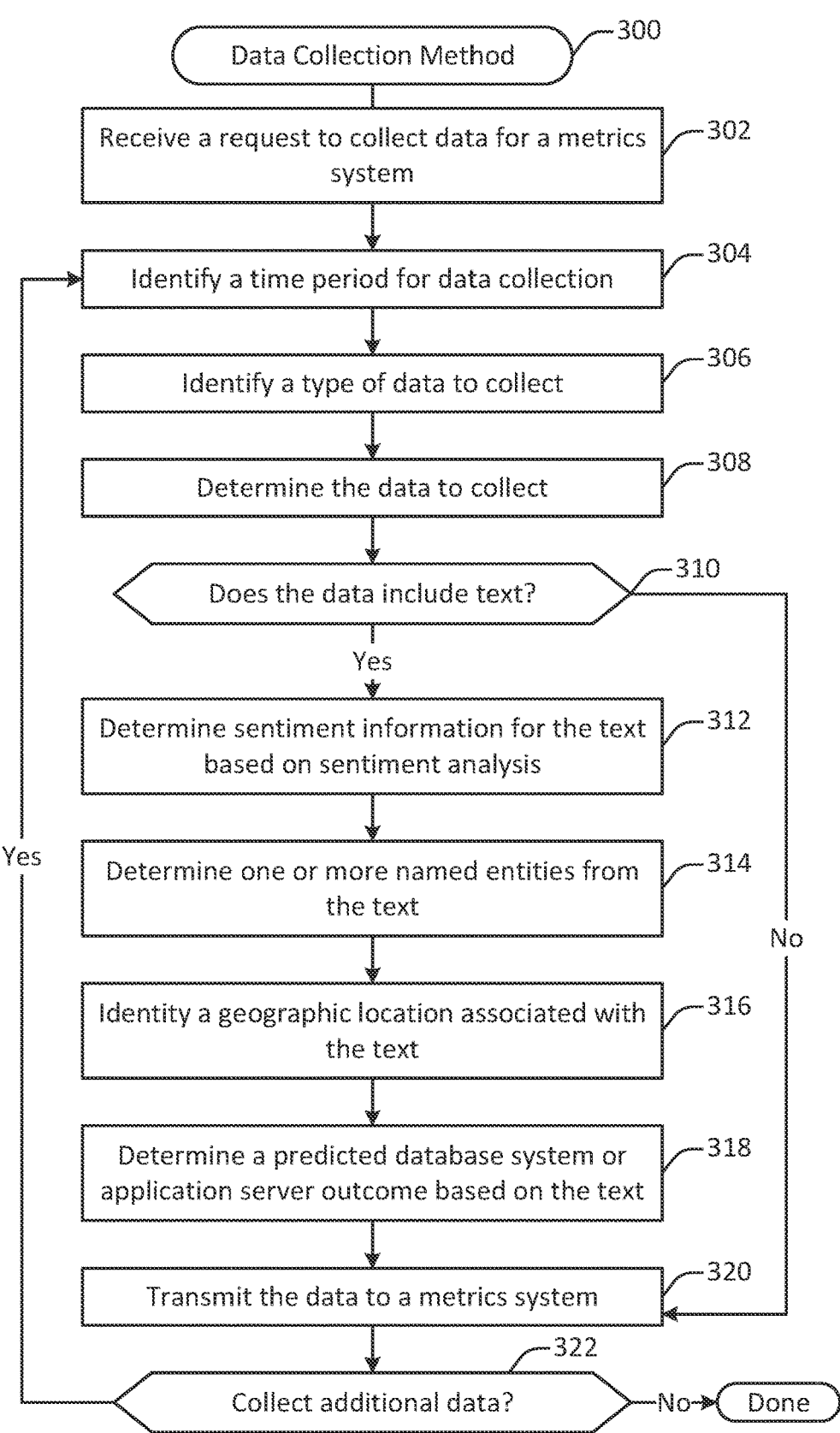
FIG. 3 illustrates a method for collecting data, performed in accordance with one or more embodiments.

FIG. 3 illustrates a method 300 for collecting data, performed in accordance with one or more embodiments. According to various embodiments, the method 300 may be performed at one or more components of a computing services system, such as the computing services system 200 shown in FIG. 2. For instance, the method 300 may be performed at any of the application metrics agent 242, the database metrics agent 222, or the textual data collector 214.

A request to collect data for a metrics system is received at 302. In some embodiments, the request may be generated periodically, for instance at an interval of once per minute or once per hour. Alternatively, a request to collect data may be generated based on a different triggering condition, such as user input. For instance, an administrator may submit a request via a user interface provided by the computing services environment indicating a desire to provide textual input regarding future application server and/or database system usage information.

A time period for data collection is identified at 304. In some embodiments, data collected for an application server or a database system may be collected for a particular time interval, such as a period of time measured in seconds, minutes, or hours. The time period may be specified by, for instance, configuration data for the system.

A type of data to collect is identified at 306. As with the time period, the type of data to collect may be specified by configuration data. According to various embodiments, any of a variety of types of data may be collected. For example, an application metrics agent may collect data such as user interactions, transaction frequencies, resource consumption patterns, and/or any other information specified by a developer or systems administrator. As another example, a database system agent may collect information such as query execution times, transaction throughput, resource utilization, and/or any other database performance or utilization data. As yet another example, a textual data collector may receive free-form text input from a system administrator, an agent of a tenant of the database system, an external data source such as a social media stream, and/or any other source of information.

The data to collect is determined at 308. According to various embodiments, the data may be determined based on the data type and time period determined at 306 and 304. The particular techniques for collecting the data may depend in significant part on the type of data being collected and the location from which it is collected. For example, data collected by an application metrics agent may be provided by an application framework via one or more function calls exposed by the application metrics agent. As another example, data collected by a database metrics agent may be collected by accessing one or more logs or other records created by the database system and reflecting information collected by the database system. As yet another example, data collected by a textual data collector may be received via a communication interface from any of a variety of sources inside and/or outside the computing services environment.

A determination is made at 310 as to whether the data includes text. If the data includes text, sentiment information for the text is determined at 312 based on sentiment analysis. One or more named entities are determined from the text at 314. According to various embodiments, named entity determination may involve resolving a portion of text into an identifiable object, such as resolving the text string "Uttar Pradesh" into a data object corresponding to the state of Uttar Pradesh in the country of India. Operations such as sentiment analysis and named entity detection may be performed via a suitable natural language processing library, such as one available through the Scikit-Learn library in Python.

A geographic location associated with the text is determined at 316. According to various embodiments, the geographic location may be identified in any of a variety of ways. For example, a geographic location may be identified by analyzing the source of an interaction with the computing system, such as an IP address from which a request was sent or an address associated with an authenticated database system account. As another example, a geographic location may be identified based on the named entity recognition performed in operation 314. For instance, a text record may identify a location such as India or California.

A predicted database system or application server outcome is determined based on the text at 318. In some embodiments, the predicted database system or application server outcome may be determined based on its being explicitly stated in the text. For example, an administrator for a tenant organization of the database system may provide text input such as: "We have a new product release coming up next week, and we expect traffic to increase by about 20%." By analyzing such information, the metrics system may determine that application traffic is anticipated to increase by about 20%, information which may then be used to formulate a prediction as to a change in database traffic.

In some embodiments, the predicted database system or application server outcome may be determined by aggregating information implicit in customer records, social networking feeds, or other such information. For example, customer records for a tenant organization or posts in a social networking stream may indicate that India is playing Pakistan in cricket on a particular date. Such an event may be associated with increased application server traffic for a computing services environment tenant that manages restaurant orders. As another example, customer records for a tenant organization or posts in a social networking stream may indicate that consumers in a particular area are unhappy because a local sports team lost a big match, potentially leading to decreased application server traffic for a computing services environment tenant that manages restaurant orders.

According to various embodiments, text may be associated with database outcomes in any of various ways. For example, various occurrences, which may or may not be specific to a geography, may be associated with various types of changes in application server and/or database system traffic. As another example, particular queries may be triggered by particular user interactions or application events. Such relationships may be determined by, for instance, mapping text data, sentiment information, geographic information, and/or named entity information into a feature embedding, which is then mapped to outcome values for a database system and/or application server. Such relationships may be iteratively learned and updated over time.

The data is transmitted to a metrics system at 320. In some embodiments, some data may be transmitted in real-time or near real-time. Alternatively, or additionally, some data may be transmitted periodically, for instance in batches. The data may be transmitted to the metrics system 202 for storage in the metrics database 212.

A determination is made at 322 as to whether to collect additional data. In some embodiments, additional data may continue to be collected until all data identified for collection has been collected. For example, configuration information may specify a particular set of metric values to be collected for a designated time period. As another example, text data may be collected from an administrator until the administrator indicates that the process should be completed.

FIG. 4 illustrates a metrics dataset 400, configured in accordance with one or more embodiments. The metrics dataset 400 may be determined based on information stored in the metrics database 212 shown in FIG. 2. The metrics dataset 400 includes database configuration values 402, observed database metric values 404, observed application server metrics values 406, and text embedding values 408.

According to various embodiments, the database configuration parameters include one or more values indicating a characteristic of the database system for a particular application server. For example, the database configuration parameters may indicate information such as a size of a virtual machine in which a database engine is implemented, a maximum number of connections allocated for the database system, an indexing setting associated with one or more database table indexes, a query execution plan setting governing the determination of query execution plans for the database system, and/or any other information.

In some embodiments, one or more database configuration parameters may be sent from the database system 220 to the metrics system 202. Alternatively, or additionally, one or more database configuration parameters may be collected directly at the metrics system 202 or received from another source within the computing services environment.

In some implementations, one or more of the database configuration parameters may be adaptively configurable by the metrics system 202 through the policy engine 210. However, one or more of the database configuration parameters may be fixed from the perspective of the metrics system. For instance, the policy engine 210 may not be authorized to perform an action such as changing the database tenants assigned to a particular node of a distributed database system.

According to various embodiments, the observed database metric values 404 and the observed application server metric values may include any or all of the information discussed herein, for instance the information discussed with respect to the method 300 shown in FIG. 3.

According to various embodiments, the text embedding values 408 may include one or more values associated with a text embedding determined based on text data. In some configurations, different text sources may be associated with different text embedding values. For example, a database system may include different text embedding vectors for text-based administrator input, text-based tenant input, customer interactions for a tenant of the database system, and an external text data source such as a social media feed.

In some implementations, the values shown in the metrics dataset 404 may vary over time. For instance, a particular metric such as a volume of data stored to the database system may be collected at one or more intervals of time (e.g., per hour, per minute, etc.) over a period of time (e.g., a week, a month, etc.).

Figure 5:
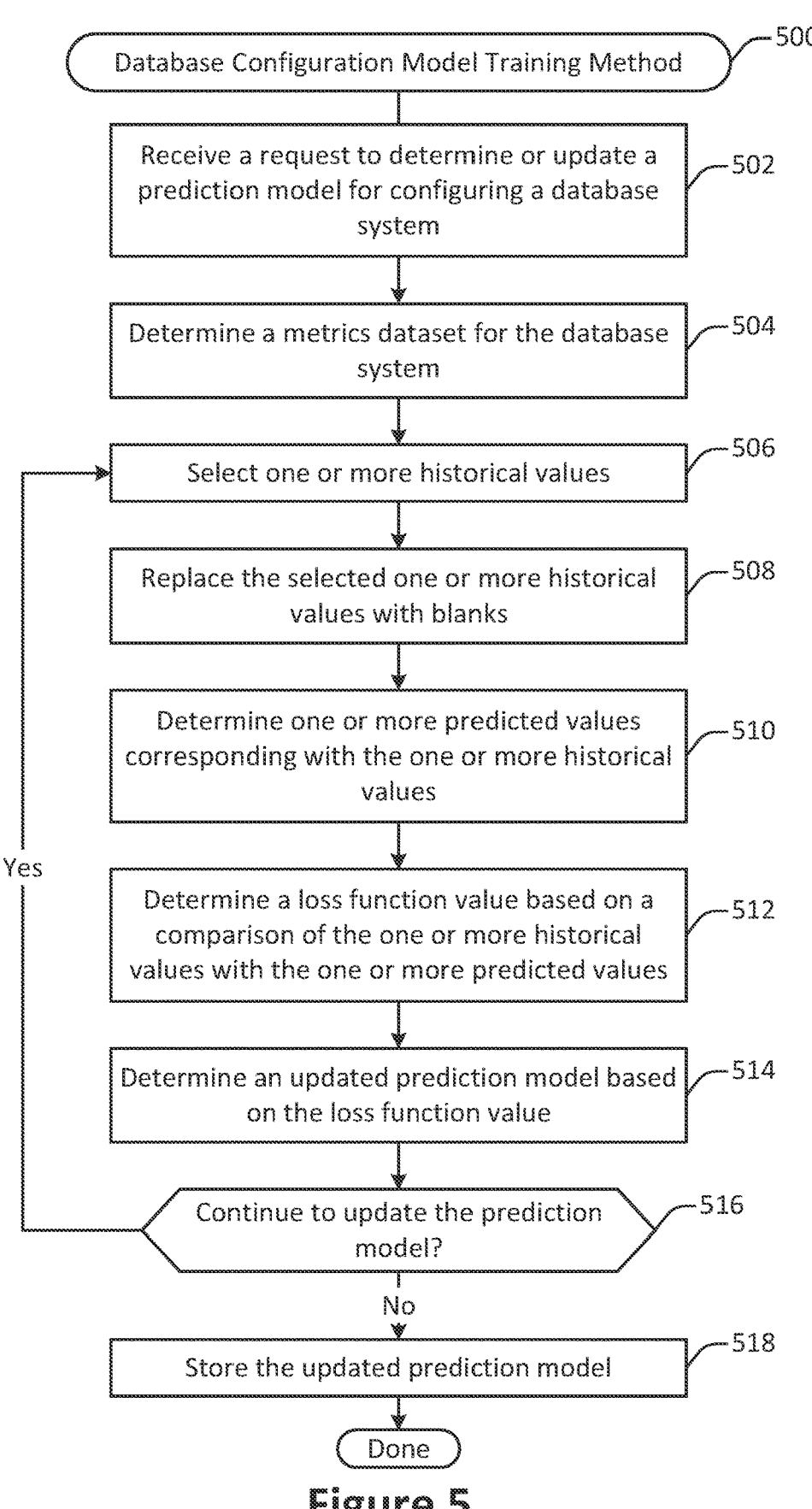
FIG. 5 illustrates a method of training a prediction model, performed in accordance with one or more embodiments.

FIG. 5 illustrates a method 500 for training a database configuration model, performed in accordance with one or more embodiments. The method 500 may be performed at a component within a computing services environment. For instance, the method 500 may be performed at the policy engine 210 shown in FIG. 2.

In some embodiments, the method 500 may be performed in order to determine a prediction model that facilitates the determination of one or more control parameters for a database system. For example, the method 500 may be performed in order to train a prediction model to determine that customers of a tenant organization tend to buy a particular type of good or service when a particular set of conditions (e.g., time of year, occurrence of a sporting event, weather forecast, etc.) are met, and that such an occurrence tends to result in an increase in application traffic for the tenant organization and hence an increase in database resources consumed for the web application accessed by the tenant organization.

A request to determine or update a prediction model for configuring a database system is received at 502. In some embodiments, the request may be generated periodically, for instance once per day or once per week. Alternatively, or additionally, such a request may be generated based upon some other triggering condition, such as a determination by the anomaly detector 208 that conditions in the database system and/or application server have changed or a determination that the existing prediction model is producing predictions having an accuracy level below a designated threshold.

According to various embodiments, any of a variety of prediction models may be employed, including any suitable supervised machine learning models. For example, the prediction model may be a neural network model such as a deep learning model, a tree-based model such as a random forest model, a regression model, or any other suitable prediction model.

A metrics dataset for the database system is determined at 504. In some embodiments, determining the metrics dataset may involve retrieving values for one or more metrics for a database system over a period of time.

One or more historical values are selected at 506. In some embodiments, the historical values may be, for instance, configurable database system parameter values. Such values may be selected at random or in any suitable sequence.

At 508, the selected one or more historical values are replaced with blanks. At 510, one or more predicted values corresponding with the one or more historical values are determined. In some embodiments, the one or more predicted values may be determined by applying the prediction model received at 502 to the historical values and the blanked values.

A loss function is determined at 512 based on a comparison of the one or more historical values with the one or more predicted values. At 514, an updated prediction model is determined based on the loss function value. According to various embodiments, the techniques employed in determining the loss function value and the updated prediction model may depend in significant part on the type of prediction model employed. For example, one or more techniques such as gradient descent, back propagation, regression parameter updating, and/or k-fold validation may be employed.

A determination is made at 516 as to whether to continue to update the prediction model. In some embodiments, the prediction model may continue to be updated until a terminating condition is met. For instance, the prediction model may continue to be updated until prediction accuracy on a portion of the dataset withheld for training purposes meets a designated threshold value.

Upon determining not to continue to update the prediction mode, the updated prediction model is stored at 518. In some embodiments, the updated prediction model may be stored in the metrics system 202 for use in determining policies for the database system, as discussed with respect to the method 600 shown in FIG. 6.

FIG. 6 illustrates a method 600 of controlling a database system, performed in accordance with one or more embodiments. The method 600 may be performed at one or more components within a computing services environment. For instance, the method 600 may be performed at the metrics system 202 in the computing services environment 200 shown in FIG. 2.

A request is received at 602 to update a configuration parameter for a database system. According to various embodiments, the request may be generated based on any of one or more triggering conditions. For example, the request may be generated at scheduled times, such as once per hour or once per day. As another example, the request may be generated based on user input, for instance from a system administrator. As yet another example, the request may be generated when a change is observed, such as when observed database system performance deviates from anticipated database system performance.

A prediction model for determining predicted database metric values is identified at 604. According to various embodiments, any of a variety of supervised machine learning models may be employed as prediction models. Examples of such models may include, but are not limited to, neural networks such as deep learning models, regression models, and tree-based models such as decision trees or random forest models. The prediction model may be retrieved from a storage device accessible to the metrics system 202, and may be trained as discussed with respect to the method 500 shown in FIG. 5.

A metrics dataset for determining the prediction is identified at 606. In some embodiments, the metrics dataset may be retrieved from a metrics database such as the metrics database 212 shown in FIG. 2. The metrics dataset may be configured as discussed with respect to FIG. 4. The metrics dataset may include any information observed over a period of time. For instance, the metrics dataset may include values observed over an hour, several hours, a day, several days, or another suitable period of time.

One or more updated configuration parameter values are determined at 608. In some embodiments, the one or more updated configuration parameter values may be determined by applying the prediction model identified at 604 to the metrics dataset identified at 606. The prediction model may be applied to a variety of metric values, which may include, but are not limited to: database configuration values, observed database metric values, observed application server metric values, and text embedding values. In this way, the configuration parameters of the database system may be determined based on not only the current and past operation of the database system itself, but on the current, past, and predicted future operation of both the database system and the application server, as well as on text information from one or more sources.

According to various embodiments, the particular operations performed when determining the predicted database metric values may depend in part on the type of prediction model employed. For example, the observed database metric values and the observed application metric values may be provided as inputs to a neural network, regression model, tree-based model, or other suitable prediction model to determine the predicted database metric values.

At 610, a database system performance value is determined based on the updated configuration parameter. In some embodiments, the database system performance value may be output by the prediction model. For instance, the prediction model may jointly predict configuration and performance parameter values.

According to various embodiments, the predicted database metric values may include one or more of any of a variety of information related to database system operation or performance. For example, the predicted database metric values may determine information such as a number of database system requests, a number of CPU cycles used, an amount of data retrieved, a number of database system rows accessed, or other such information.

A determination is made at 612 as to whether the database system performance value exceeds a designated threshold. In some embodiments, the determination may involve comparing the performance value determined at 610 to a configuration parameter specified by, for instance, a provider of the computing services environment. In particular embodiments, a combination of performance values and/or thresholds may be used.

Upon determining that the database system performance value does not exceed the designated threshold, then at 616 the metrics dataset is updated with the one or more updated configuration parameter values. The system may then iteratively determine new configuration parameter values and new predicted database system performance values until a configuration is determined that results in a prediction that the database system has entered an acceptable state.

Upon determining instead that the database system performance value does not exceed the designated threshold, an instruction is transmitted at 614 from the metrics system to the database system to update one or more configuration parameters based on the one or more updated configuration parameter values. In some embodiments, transmitting the instruction may involve calling a pipeline to implement one or more changes to a database system. For example, a change in a configuration parameter that governs an amount of computing resources available to the database system may result in initiating a pipeline that spawns a new virtual machine with a change in resources and then moves one or more elements of the database system to the new virtual machine.

Figure 7:
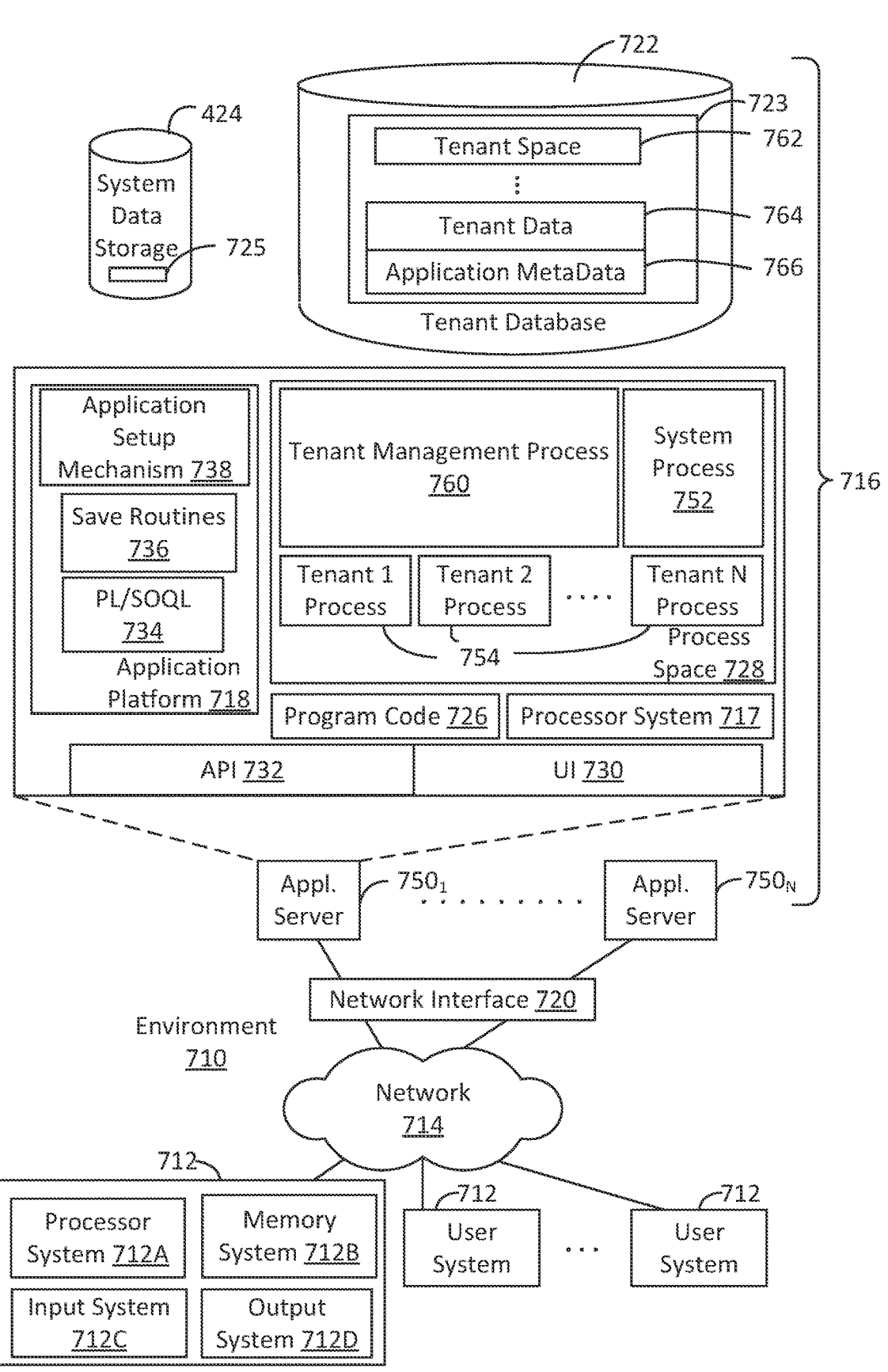
FIG. 7 shows a block diagram of an example of an environment that includes an on-demand database service configured in accordance with some implementations.

FIG. 7 shows a block diagram of an example of an environment 710 that includes an on-demand database service configured in accordance with some implementations. Environment 710 may include user systems 712, network 714, database system 716, processor system 717, application platform 718, network interface 720, tenant data storage 722, tenant data 723, system data storage 724, system data 725, program code 726, process space 728, User Interface (UI) 730, Application Program Interface (API) 732, PL/SOQL 734, save routines 736, application setup mechanism 738, application servers 750-1 through 750-N, system process space 752, tenant process spaces 754, tenant management process space 760, tenant storage space 762, user storage 764, and application metadata 766. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 716, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 718 may be a framework that allows the creation, management, and execution of applications in system 716. Such applications may be developed by the database service provider or by users or third-party application developers accessing the service. Application platform 718 includes an application setup mechanism 738 that supports application developers' creation and management of applications, which may be saved as metadata into tenant data storage 722 by save routines 736 for execution by subscribers as one or more tenant process spaces 754 managed by tenant management process 760 for example. Invocations to such applications may be coded using PL/SOQL 734 that provides a programming language style interface extension to API 732. A detailed description of some PL/SOQL language implementations is discussed in commonly assigned U.S. Pat. No. 8,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 766 for a subscriber making such an invocation. Such system processes may also manage execution of application metadata 766 as an application in a virtual machine.

In some implementations, each application server 750 may handle requests for any user associated with any organization. A load balancing function (e.g., an F5 Big-IP load balancer) may distribute requests to the application servers 750 based on an algorithm such as least-connections, round robin, observed response time, etc. Each application server 750 may be configured to communicate with tenant data storage 722 and the tenant data 723 therein, and system data storage 724 and the system data 725 therein to serve requests of user systems 712. The tenant data 723 may be divided into individual tenant storage spaces 762, which can be either a physical arrangement and/or a logical arrangement of data. Within each tenant storage space 762, user storage 764 and application metadata 766 may be similarly allocated for each user. For example, a copy of a user's most recently used (MRU) items might be stored to user storage 764. Similarly, a copy of MRU items for an entire tenant organization may be stored to tenant storage space 762. A UI 730 provides a user interface and an API 732 provides an application programming interface to system 716 resident processes to users and/or developers at user systems 712.

System 716 may implement a web-based database management system. For example, in some implementations, system 716 may include application servers configured to implement and execute database system control software applications. The application servers may be configured to provide related data, code, forms, web pages and other information to and from user systems 712. Additionally, the application servers may be configured to store information to, and retrieve information from a database system. Such information may include related data, objects, and/or Webpage content. With a multi-tenant system, data for multiple tenants may be stored in the same physical database object in tenant data storage 722, however, tenant data may be arranged in the storage medium(s) of tenant data storage 722 so that data of one tenant is kept logically separate from that of other tenants. In such a scheme, one tenant may not access another tenant's data, unless such data is expressly shared.

Several elements in the system shown in FIG. 7 include conventional, well-known elements that are explained only briefly here. For example, user system 712 may include processor system 712A, memory system 712B, input system 712C, and output system 712D. A user system 712 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 712 to access, process and view information, pages and applications available from system 716 over network 714. Network 714 may be any network or combination of networks of devices that communicate with one another, such as any one or any combination of a LAN (local area network), WAN (wide area network), wireless network, or other appropriate configuration.

The users of user systems 712 may differ in their respective capacities, and the capacity of a particular user system 712 to access information may be determined at least in part by "permissions" of the particular user system 712. As discussed herein, permissions generally govern access to computing resources such as data objects, components, and other entities of a computing system, such as an application server, a social networking system, and/or a CRM database system. "Permission sets" generally refer to groups of permissions that may be assigned to users of such a computing environment. For instance, the assignments of users and permission sets may be stored in one or more databases of System 716. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 716 may provide on-demand database service to user systems 712 using an MTS arrangement. By way of example, one tenant organization may be a company that employs a sales force where each salesperson uses system 716 to manage their sales process. Thus, a user in such an organization may maintain contact data, leads data, customer follow-up data, performance data, goals and progress data, etc., all applicable to that user's personal sales process (e.g., in tenant data storage 722). In this arrangement, a user may manage his or her sales efforts and cycles from a variety of devices, since relevant data and applications to interact with (e.g., access, view, modify, report, transmit, calculate, etc.) such data may be maintained and accessed by any user system 712 having network access.

When implemented in an MTS arrangement, system 716 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 716 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 716 may also maintain system-level data usable by multiple tenants or other data. Such system-level data may include industry reports, news, postings, and the like that are sharable between tenant organizations.

In some implementations, user systems 712 may be client systems communicating with application servers 750 to request and update system-level and tenant-level data from system 716. By way of example, user systems 712 may send one or more queries requesting data of a database maintained in tenant data storage 722 and/or system data storage 724. An application server 750 of system 716 may automatically generate one or more SQL statements (e.g., one or more SQL queries) that are designed to access the requested data. System data storage 724 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 8,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figures 8A, 8B:
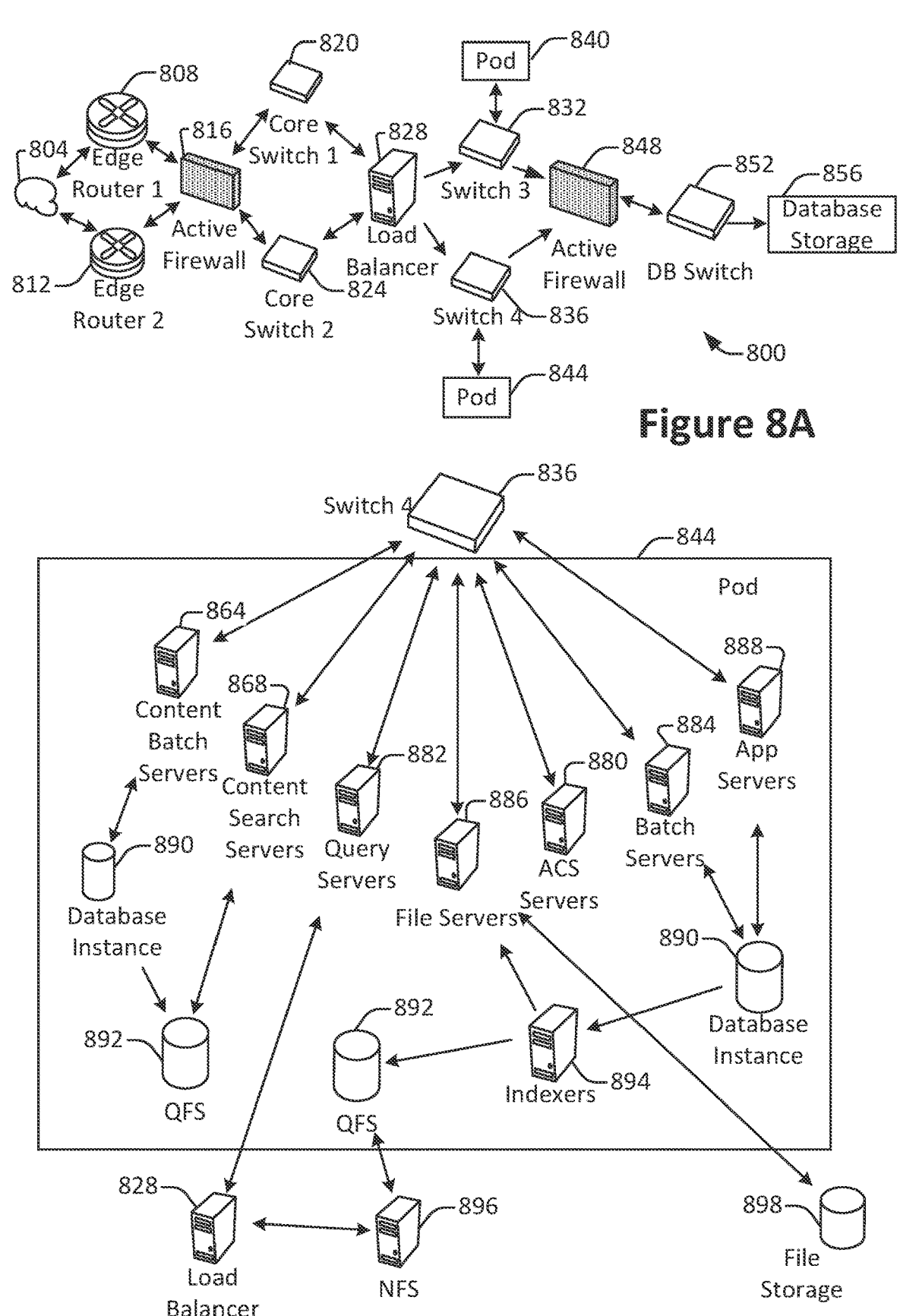
FIG. 8A shows a system diagram of an example of architectural components of an on-demand database service environment, configured in accordance with some implementations.
FIG. 8B shows a system diagram further illustrating an example of architectural components of an on-demand database service environment, in accordance with some implementations.

FIG. 8A shows a system diagram of an example of architectural components of an on-demand database service environment 800, configured in accordance with some implementations. A client machine located in the cloud 804 may communicate with the on-demand database service environment via one or more edge routers 808 and 812. A client machine may include any of the examples of user systems?12 described above. The edge routers 808 and 812 may communicate with one or more core switches 820 and 824 via firewall 816. The core switches may communicate with a load balancer 828, which may distribute server load over different pods, such as the pods 840 and 844 by communication via pod switches 832 and 836. The pods 840 and 844, which may each include one or more servers and/or other computing resources, may perform data processing and other operations used to provide on-demand services. Components of the environment may communicate with a database storage 856 via a database firewall 848 and a database switch 852.

Accessing an on-demand database service environment may involve communications transmitted among a variety of different components. The environment 800 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 8A and 8B.

The cloud 804 refers to any suitable data network or combination of data networks, which may include the Internet. Client machines located in the cloud 804 may communicate with the on-demand database service environment 800 to access services provided by the on-demand database service environment 800. By way of example, client machines may access the on-demand database service environment 800 to retrieve, store, edit, and/or process database system metrics, text data, and/or application server metrics information.

In some implementations, the edge routers 808 and 812 route packets between the cloud 804 and other components of the on-demand database service environment 800. The edge routers 808 and 812 may employ the Border Gateway Protocol (BGP). The edge routers 808 and 812 may maintain a table of IP networks or 'prefixes', which designate network reachability among autonomous systems on the internet.

In one or more implementations, the firewall 816 may protect the inner components of the environment 800 from internet traffic. The firewall 816 may block, permit, or deny access to the inner components of the on-demand database service environment 800 based upon a set of rules and/or other criteria. The firewall 816 may act as one or more of a packet filter, an application gateway, a stateful filter, a proxy server, or any other type of firewall.

In some implementations, the core switches 820 and 824 may be high-capacity switches that transfer packets within the environment 800. The core switches 820 and 824 may be configured as network bridges that quickly route data between different components within the on-demand database service environment. The use of two or more core switches 820 and 824 may provide redundancy and/or reduced latency.

In some implementations, communication between the pods 840 and 844 may be conducted via the pod switches 832 and 836. The pod switches 832 and 836 may facilitate communication between the pods 840 and 844 and client machines, for example via core switches 820 and 824. Also or alternatively, the pod switches 832 and 836 may facilitate communication between the pods 840 and 844 and the database storage 856. The load balancer 828 may distribute workload between the pods, which may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848, which may act as a computer application firewall operating at the database application layer of a protocol stack. The database firewall 848 may protect the database storage 856 from application attacks such as structure query language (SQL) injection, database rootkits, and unauthorized information disclosure. The database firewall 848 may include a host using one or more forms of reverse proxy services to proxy traffic before passing it to a gateway router and/or may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, the database storage 856 may be an on-demand database system shared by many different organizations. The on-demand database service may employ a single-tenant approach, a multi-tenant approach, a virtualized approach, or any other type of database approach. Communication with the database storage 856 may be conducted via the database switch 852. The database storage 856 may include various software components for handling database queries. Accordingly, the database switch 852 may direct database queries transmitted by other components of the environment (e.g., the pods 840 and 844) to the correct components within the database storage 856.

FIG. 8B shows a system diagram further illustrating an example of architectural components of an on-demand database service environment, in accordance with some implementations. The pod 844 may be used to render services to user(s) of the on-demand database service environment 800. The pod 844 may include one or more content batch servers 864, content search servers 868, query servers 882, file servers 886, access control system (ACS) servers 880, batch servers 884, and app servers 888. Also, the pod 844 may include database instances 890, quick file systems (QFS) 892, and indexers 894. Some or all communication between the servers in the pod 844 may be transmitted via the switch 836.

In some implementations, the app servers 888 may include a framework dedicated to the execution of procedures (e.g., programs, routines, scripts) for supporting the construction of applications provided by the on-demand database service environment 800 via the pod 844. One or more instances of the app server 888 may be configured to execute all or a portion of the operations of the services described herein.

In some implementations, as discussed above, the pod 844 may include one or more database instances 890. A database instance 890 may be configured as an MTS in which different organizations share access to the same database, using the techniques described above. Database information may be transmitted to the indexer 894, which may provide an index of information available in the database 890 to file servers 886. The QFS 892 or other suitable filesystem may serve as a rapid-access file system for storing and accessing information available within the pod 844. The QFS 892 may support volume management capabilities, allowing many disks to be grouped together into a file system. The QFS 892 may communicate with the database instances 890, content search servers 868 and/or indexers 894 to identify, retrieve, move, and/or update data stored in the network file systems (NFS) 896 and/or other storage systems.

In some implementations, one or more query servers 882 may communicate with the NFS 896 to retrieve and/or update information stored outside of the pod 844. The NFS 896 may allow servers located in the pod 844 to access information over a network in a manner similar to how local storage is accessed. Queries from the query servers 822 may be transmitted to the NFS 896 via the load balancer 828, which may distribute resource requests over various resources available in the on-demand database service environment 800. The NFS 896 may also communicate with the QFS 892 to update the information stored on the NFS 896 and/or to provide information to the QFS 892 for use by servers located within the pod 844.

In some implementations, the content batch servers 864 may handle requests internal to the pod 844. These requests may be long-running and/or not tied to a particular customer, such as requests related to log mining, cleanup work, and maintenance tasks. The content search servers 868 may provide query and indexer functions such as functions allowing users to search through content stored in the on-demand database service environment 800. The file servers 886 may manage requests for information stored in the file storage 898, which may store information such as documents, images, basic large objects (BLOBs), etc. The query servers 882 may be used to retrieve information from one or more file systems. For example, the query system 882 may receive requests for information from the app servers 888 and then transmit information queries to the NFS 896 located outside the pod 844. The ACS servers 880 may control access to data, hardware resources, or software resources called upon to render services provided by the pod 844. The batch servers 884 may process batch jobs, which are used to run tasks at specified times. Thus, the batch servers 884 may transmit instructions to other servers, such as the app servers 888, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 9:
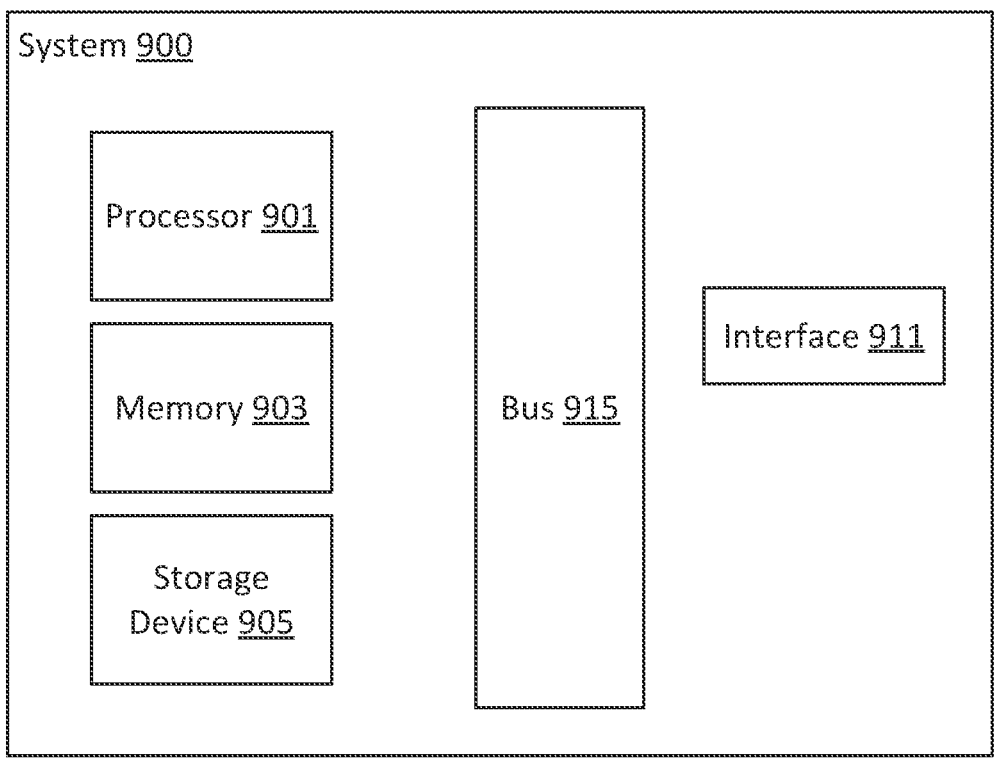
FIG. 9 illustrates one example of a computing device.

FIG. 9 illustrates one example of a computing device. According to various embodiments, a system 900 suitable for implementing embodiments described herein includes a processor 901, a memory module 903, a storage device 905, an interface 911, and a bus 915 (e.g., a PCI bus or other interconnection fabric.) System 900 may operate as variety of devices such as an application server, a database server, or any other device or service described herein. Although a particular configuration is described, a variety of alternative configurations are possible. The processor 901 may perform operations such as those described herein. Instructions for performing such operations may be embodied in the memory 903, on one or more non-transitory computer readable media, or on some other storage device. Various specially configured devices can also be used in place of or in addition to the processor 901. The interface 911 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of multi-tenant database systems. However, the techniques disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

What is claimed is:

1. A method comprising:

determining via a processor one or more observed database metric values characterizing observed database performance information about a database system implemented in a computing services environment;

determining via the processor one or more observed application metric values characterizing observed performance information about a network-accessible application implemented on an application server in the computing services environment, the application server storing information in the database system generated while providing computing services via the computing services environment;

determining via the processor text data included in the stored information, the text data being included in customer records associated with a tenant of the database system or information associated with a social networking stream;

determining via the processor a plurality of text embedding values based on the text data;

determining an updated database system configuration setting for the database system by applying a machine learning prediction model to a dataset including the one or more observed database metric values, the plurality of text embedding values, and the one or more observed application metric values, the updated database system configuration setting being determined based on a change in network-accessible application usage predicted by the machine learning prediction model based, at least in part, on the text data;

transmitting an instruction to update the database system based on the updated database system configuration setting; and updating the database system based on the instruction and the updated database system configuration setting.

2. The method recited in claim 1, wherein the dataset is a metrics dataset that includes the text embedding.

3. The method recited in claim 2, wherein the text input includes text characterizing a prediction from a user regarding future usage information for the database system.

4. The method recited in claim 2, wherein the text input includes text characterizing a prediction from a user regarding future usage information for the network-accessible application.

5. The method recited in claim 2, wherein the text input includes implicit information received from a social networking feed.

6. The method recited in claim 2, wherein the text input includes text selected from one or more text records stored in the database system.

7. The method recited in claim 1, the method further comprising:

receiving via a communication interface an observed database metric value of the one or more observed database metrics values from an application metrics agent in the application server.

8. The method recited in claim 1, the method further comprising:

receiving via a communication interface an observed database metric value of the one or more observed database metrics values from a database metrics agent in the database system.

9. The method recited in claim 1, wherein the updated database system configuration setting is determined upon detecting an anomaly in the database system.

10. The method recited in claim 1, wherein the machine learning prediction model is configured to determine a predicted future application metric value characterizing predicted future performance information for the network-accessible application.

11. The method recited in claim 1, wherein the machine learning prediction model is configured to determine a predicted future database metric value characterizing predicted future performance information for the database system.

12. The method recited in claim 1, the method further comprising:

performing sentiment analysis on text data to determine sentiment information for the text data, wherein the dataset includes the sentiment information.

13. The method recited in claim 1, the method further comprising:

performing named entity analysis on text data to identify a named entity in the text data, wherein the dataset includes the named entity.

14. The method recited in claim 1, the method further comprising:

analyzing text data to identify a geographic location named in the text data, wherein the dataset includes the geographic location.

15. A system comprising:

a metrics database storing:

one or more observed database metric values characterizing observed database performance information about a database system implemented in a computing services environment;

one or more observed application metric values characterizing observed performance information about a network-accessible application implemented on an application server in the computing services environment, the application server storing information in the database system generated while providing computing services via the computing services environment;

a policy engine implemented via one or more computing devices configured to:

determine text data included in customer records associated with a tenant of the database system or information associated with a social networking stream;

determine a plurality of text embedding values based on the text data;

determine an updated database system configuration setting for the database system by applying a machine learning prediction model to a dataset including the one or more observed database metric values, the plurality of text embedding values, and the one or more observed application metric values, the updated database system configuration setting being determined based on a change in network-accessible application usage predicted by the machine learning prediction model based, at least in part, on the text data; and a communication interface configured to transmit an instruction configured to cause the update of the database system based on the updated database system configuration setting.

16. The system recited in claim 15, wherein the dataset is a metrics dataset that includes the text embedding.

17. The system recited in claim 16, wherein the text input includes text characterizing a prediction from a user regarding future usage information for the database system.

18. The system recited in claim 16, wherein the text input includes text characterizing a prediction from a user regarding future usage information for the network-accessible application.

19. The system recited in claim 16, wherein the text input includes implicit information received from a social networking feed.

20. One or more non-transitory computer readable media having instructions stored thereon for performing a method, the method comprising:

determining via a processor one or more observed database metric values characterizing observed database performance information about a database system implemented in a computing services environment;

determining via the processor one or more observed application metric values characterizing observed performance information about a network-accessible application implemented on an application server in the computing services environment, the application server storing information in the database system generated while providing computing services via the computing services environment;

determining via the processor text data included in the stored information, the text data being included in customer records associated with a tenant of the database system or information associated with a social networking stream;

determining via the processor a plurality of text embedding values based on the text data;

determining an updated database system configuration setting for the database system by applying a machine learning prediction model to a dataset including the one or more observed database metric values, the plurality of text embedding values, and the one or more observed application metric values, the updated database system configuration setting being determined based on a change in network-accessible application usage predicted by the machine learning prediction model based, at least in part, on the text data; and transmitting an instruction configured to cause the update of the database system based on the updated database system configuration setting.

* * * * *